United States Patent
Kerö et al.

(10) Patent No.: US 7,263,626 B2
(45) Date of Patent: Aug. 28, 2007

(54) METHOD FOR SYNCHRONIZING COMPUTER CLOCKS IN NETWORKS USED FOR INFORMATION TRANSMISSION, DEVICE FOR CARRYING OUT SAID METHOD AND DATA PACKET SUITABLE FOR THE SYNCHRONIZATION OF COMPUTER CLOCKS

(76) Inventors: Nikolaus Kerö, Tröschgasse 7, Perchtoldsdorf (AT) A-2380; Ulrich Schmid, c/o Technische Universität Wein, Institut für Automation, Treitlstrasse 1, Vienna (AT) A-1040; Martin Horauer, c/o Technische Institut für Automation, Treitlstrasse 1, Vienna (AT) A-1040

( * ) Notice: Subject to any disclaimer, the term of this patent is extended or adjusted under 35 U.S.C. 154(b) by 231 days.

(21) Appl. No.: 10/239,680

(22) PCT Filed: Mar. 6, 2001

(86) PCT No.: PCT/AT01/00064

§ 371 (c)(1), (2), (4) Date: Feb. 11, 2003

(87) PCT Pub. No.: WO01/67216

PCT Pub. Date: Sep. 13, 2001

(65) Prior Publication Data
US 2003/0154309 A1 Aug. 14, 2003

(30) Foreign Application Priority Data
Mar. 6, 2000 (AT) .............................. GM153/2000

(51) Int. Cl.
*G06F 1/12* (2006.01)
*G06F 1/04* (2006.01)
*G06F 15/16* (2006.01)

(52) U.S. Cl. .................. 713/400; 713/375; 709/248
(58) Field of Classification Search ................ 709/248; 713/400, 375
See application file for complete search history.

(56) References Cited

U.S. PATENT DOCUMENTS

| | | | | | |
|---|---|---|---|---|---|
| 4,337,463 | A | * | 6/1982 | Vangen | 340/825.2 |
| 4,530,091 | A | * | 7/1985 | Crockett | 370/229 |
| 5,467,464 | A | * | 11/1995 | Oprescu et al. | 713/400 |
| 5,473,668 | A | * | 12/1995 | Nakahara | 455/465 |
| 5,570,346 | A | * | 10/1996 | Shur | 370/231 |
| 5,579,513 | A | | 11/1996 | Strohmer | |
| 5,790,805 | A | | 8/1998 | Bantum | |
| 5,850,501 | A | * | 12/1998 | Yanagihara | 386/112 |
| 5,867,564 | A | * | 2/1999 | Bhusri | 379/111 |

(Continued)

*Primary Examiner*—Thomas Lee
*Assistant Examiner*—Ji H. Bae
(74) *Attorney, Agent, or Firm*—Chapman and Cutler LLP

(57) ABSTRACT

The invention relates to a method for synchronizing computer clocks in networks used for the transmission of information according to which information is dispatched with a time stamp when being dispatched and which is re-transmitted with a time stamp in a confirmation of receipt. The time stamps are inserted in the outgoing or arriving data packet by a clock module (8) mounted downstream of a network controller (4, 10) once said network controller has authorized transmission. A CPU (2) generates actuator signals that are provided with an identifier and that correct the clock modules (8) on the basis of a comparison between the time stamps in a confirmation of receipt of the addressee of the information and the time stamp of the corresponding transmitted information.

21 Claims, 3 Drawing Sheets

U.S. PATENT DOCUMENTS 6,005,872 A * 12/1999 Bassi et al. .................. 370/477
6,023,769 A    2/2000 Gonzalez
6,407,641 B1 * 6/2002 Williams et al. ............ 331/1 A
6,661,810 B1 * 12/2003 Skelly et al. ................ 370/516
6,816,510 B1 * 11/2004 Banerjee ..................... 370/503

* cited by examiner

METHOD FOR SYNCHRONIZING COMPUTER CLOCKS IN NETWORKS USED FOR INFORMATION TRANSMISSION, DEVICE FOR CARRYING OUT SAID METHOD AND DATA PACKET SUITABLE FOR THE SYNCHRONIZATION OF COMPUTER CLOCKS

The invention relates to a method for synchronizing computer clocks in networks for the information transfer, in which a data packet is sent with a time stamp at the moment of its sending, and is returned with a time stamp in a receipt confirmation, a device for synchronizing computer clocks in networks for the information transfer, in which a data packet is equipped with a time stamp at the moment of its sending, and with a time stamp at the moment of receipt at the target address, as well as a data packet for synchronizing computer clocks in information transfer networks for networked computers.

BACKGROUND OF THE INVENTION

In addition to a central processing unit (CPU) and a memory, a computer also requires interfaces to the outside for its operation that can be constructed in different ways. A system bus is directly connected to the computer, which is generally constructed as a parallel interface so that depending on the processor clock, or on the bus clock, a multitude of bits can be allowed in and out. If information is to be transferred via lines, this can generally also occur via parallel interfaces, whereby the line length is limited due to the large amount of lines required. Transfer processes were therefore developed for the distance transfer of information or data, in which the initially parallel existing signals were converted into serial signal so that they could then be sent and received via a low amount of lines. For this purpose, computers are usually equipped with network cards that are connected to the respective system bus, whereby standard parallel interfaces were recommended in this case. One example of such a standard interface is the so-called PCI bus. A network controller or a network card is successively connected to such a bus, which in addition to the network controller also contains an additional interface that is adjusted to the selected transfer medium, or to the selected network structure. Among other tasks, this media-specific interface takes on the adjustment of the levels to the post-connected line network, whereby bus networks are commonly used. In the case of bus networks, all computers are connected to a mutual bus, whereby each participant can access the bus, and can reach each participant connected. In order to control access to such bus structures, the CSMA (carrier sense multiple access) process is used, for example. In this process, an attempt is made to avoid collisions by simultaneously occurring transfers. If two participants simultaneously recognized and sent a free line network, such collisions would occur. However, this is prevented by the fact that the transfer media is tapped by the stations before the transfer is started, for which bit structures are used with which collision recognition is possible. Such bit structures are called CSMAICD packets, whereby CD stands for "collision detection" or collision recognition. In addition to bus networks, star networks, ring networks, and token ring networks are common, and various types of transfer protocols are used with which a more or less large maximum transfer speed can be achieved. Such transfer protocols have been known, for instance, as Ethernet protocols (IEEE 803), or as firewire protocols (IEEE1394). The analog applies to, for instance, CAN, FDDI, ATM, or gigabit Ethernet protocols.

The network controller, together with the media-specific interface, provides the translation of the parallel data flows into a serial data flow, whereby the desired conventions, or protocols are maintained in order to avoid any collisions. Network cards usually contain memory in order to retain information as long as a data line is occupied, or the data packet is incomplete, or is present in a form that is unsuitable for the protocol. This stored information is subsequently fed into the network when a free line is detected. Because of this intermediate storage until the release of transfer, the data packets experience various delays due to the network card. This is also true for so-called switches, in which certain information to be sent to an addressee is stored up until a certain time, at which a larger packet can be sent at a higher speed.

In computer networks that must be checked to ensure that a universal time base is available to all computers, it is also important to recognize when the information was received from another networked computer in addition to when the information was sent. Although computer clocks for the clocking of a computer allow for the determination of time at which a processor has made information available to the network card, they do not recognize when the network card has actually performed the transfer via the data transfer line. Therefore, additional computer clocks have been recommended, by means of which the time critical data packets are equipped with a time stamp at the time of the actual transfer. Such computer clocks have already been connected between the network controller and the media-specific interface, whereby the network controller and the media-specific interface are connected to each other via a media-independent interface (MIIF), and the computer clock is connected between these two components. In order to make complete information on the actual time of transfer of the information available to the respective sending CPU, this inter-connected computer clock must echo the time of the actual transfer to the assigned processor. In this regard, it is advisable to perform an echo into the system bus via a separate component group, whereby such components can be called PCI bridges, for instance, and communicate with the PCI bus of the computer. The circuit complexity and hardware expenditure of such modifications, however, is relatively high and requires the additional equipment of computers with additional interfaces and additional interface cards.

DESCRIPTION OF THE INVENTION

The invention is aimed at reducing the hardware expenditure and the circuit complexity for the synchronization of a universal time base in information transfer networks, and to avoid subsequent hardware changes so that the desired universal time base can be achieved at a substantially higher precision by merely performing a respective software adjustment. In solving this task the inventive method essentially consists of the fact that the time stamps are inserted by a post-connected clock module into the outgoing or incoming data packet after the release of the transfer by a network controller, and that a CPU generates configuration signals for the correction of the clock module, said configuration signals being equipped with an identifier, wherein the generation of configuration signals is based on a comparison of time stamps in a receipt confirmation by the addressee of the data packet and the time stamp of the relating data packet sent. By the fact that the time stamps are inserted after release of the transfer by means of network switching by a clock module, such clock modules can be arranged within the media-independent interface, and can also be arranged directly on the network card so that merely the respective network card must be connected to the respective system bus of the processor. At the same time, this arrangement ensures that the time stamp is not actually inserted until the network controller performs the transfer. However, an echo of the correct receipt, which is simultaneously equipped with a time stamp, does not necessarily lead to a respectively active synchronization of the clock circuit as the configuration signals, or the setup signals, as well as possibly the control signals and/or the status signals must be exchanged with the clock module for purposes of improving the precision and accuracy of the time basis. However, such configuration signals may be sent only by the assigned CPU or a remote CPU, when an error of the time basis due to exterior influences is to be safely avoided, whereby these control signals may be processed only by the respectively responding clock module. In the controlling of all clocks by a remote CPU in the network, the data transfer of each clock to the remote CPU is achieved by means of a simple (undocumented) return transfer of the data packet by each local CPU. The required echo of status information by echoing all data packets identified for the local computer clock to the remote computer can occur by the local CPU for the purpose of correction and control of a local computer clock by means of a remote computer in the network. According to the invention, a CPU generates configuration signals that are equipped with an identifier, whereby the generation of the configuration signals is based on a comparison of the time stamp contained in a receipt confirmation of the addressee of the data packet and the time stamp of the data packet it has sent, and provides this exclusively to the clock module, which is to perform the respective correction. Therefore, the identification additionally required in the course of such configuration signals ensures that the clock module assigned to a computer can selectively respond, and in itself cannot be influenced by any signals from the network so that a high degree of safety, as well as a higher precision provided by the possibility of a continuous or iterative reset can be achieved.

Advantageously, the inventive method is performed in such a way that configuration signals for the correction, control signals and/or status signals of the clock modules are transferred with an identifier that is evaluated by a packet detection logic of a clock module, and that such configuration signals transferred with an identifier are used for the correction of the time of the respective clock module. Principally, as previously mentioned, a separate bus connection for the echo to the related CPU should be avoided for reasons of simplifying the expenditure of hardware. In order to ensure that the respective configuration signals, control signals and/or status signals are actually transferred only to the respectively assigned clock module, it is therefore necessary to ensure that the identifiers are detected and evaluated by a component of the clock module itself, or the network controller.

Some media-specific interfaces, for instance, can be switched by means of an additional data line in such a way that such signals are transferred back not to the network, but to the CPU, which have generated the signals, whereby such an interface switching can also be realized directly in a component group that contains the clock circuit. Advantageously, the action chosen for this purpose is that the network controller communicates directly with an interface circuit and generates a command for causing configuration, control, and/or status signals that are sent to the clock circuit by a CPU to return to the CPU that has generated the signals.

In this regard it is principally possible and of benefit to use a special processor, i.e. a remote CPU, for the synchronization, whereby the action advantageously chosen for this purpose is that the data packets for the correction, control, and status signals of a local computer clock are calculated on a remote computer in the network, and are sent out as a data packet to the network controller of the respective computer clock.

In an especially simple manner, the synchronization of computer clocks in networks occurs by means of switches, whereby the residence time of each data packet in the switch is measured, and each switch is equipped with a computer clock and suitable time measurement device at all switch ports.

The inventive device for synchronizing a universal time basis is essentially characterized in that a clock module is assigned to each network controller, which contains a packet detection logic and a clock controller, whereby configuration, control, and/or status signals sent out by a CPU are performed, or processed after the clock controller checks the target address in the network controller, and information is entered into the detected packet. As previously mentioned, the detection of the signals equipped with an identifier can be performed by a component of the clock module. The device can also be embodied in such a way that the network controller is connected to the interface via a separate line for the transmission device reverse, bypassing the clock module, in order to detect configuration, control, and/or status query signals.

In order to additionally reduce the extent of switching-technical modifications, however, such a separate control line between the network controller and the media-specific interface can be omitted if the respective logic for the detection of configuration, control, and/or status query signals and a respective interface are integrated into the clock module that is switched to the media-independent interface, which performs the return of such signals to the respective CPU that has generated the signals. Advantageously, the embodiment is therefore chosen so that the packet detection logic for the detection of configuration, control, and/or status query signals, and the related computer clock are combined into one component group, and particularly are integrated. This creates a particularly simple circuit arrangement that can be easily integrated into conventional network cards, in which it is subsequently merely necessary to provide the CPU with the possibility by means of respective software programming, to evaluate the returning signals correspondingly in order to generate the required setup signals for the post adjustment of the clock module.

The data packet for the synchronization of clock circuits in information transfer networks for networked computers is for this purpose characterized that the data packet contains at least one identifier for packet types in addition to the fields for the target address, source address, and data, which is characteristic for configuration, control, and/or status query signals. The common transfer protocols, as they are applied in data and communication technology, usually contain a defined amount of bits for the packet type detection so that such identifications can be accommodated without modification, for instance in the bit structure of CSMA data packets with collision identification.

BRIEF DESCRIPTION OF THE DRAWINGS

The invention is explained in further detail by the embodiment examples schematically illustrated in the drawings as follows. The drawings show, in FIGS. 1 and 2, a first and a second embodiment of inventive devices connected to each other, and, in FIG. 3, a further embodiment of the inventive device.

Figure 1:
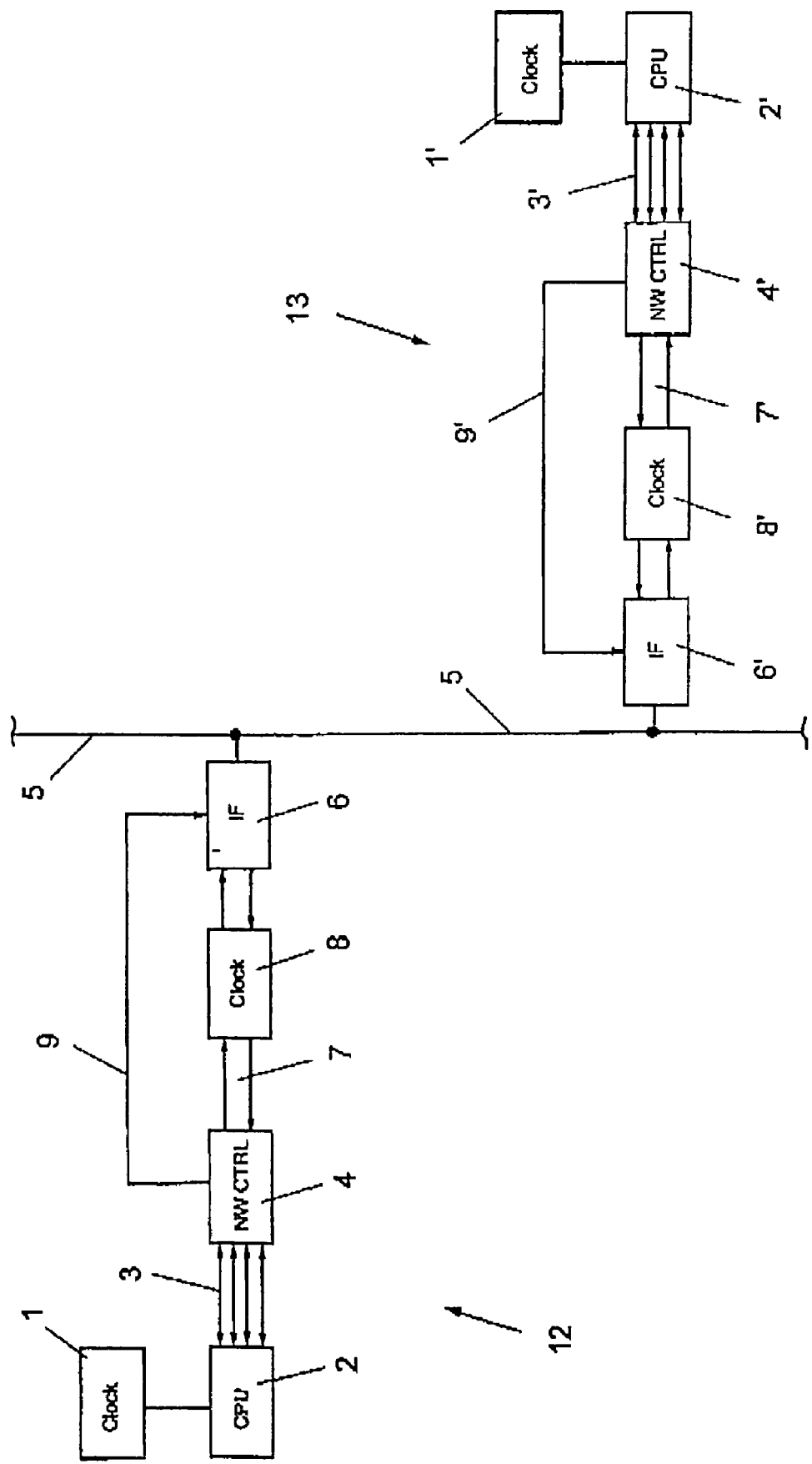
FIG. 1 shows a device 12 comprising a clock 1 and an associated CPU 2. The CPU 2 hereby represents the central component that is connected to a network controller 4 of a network card via a bus structure 3 designed as a parallel bus. In the illustration according to FIGS. 1 and 2, a bus structure was selected as an example, the backbone of which is identified by 5, which backbone 5 may connect the device 12 with another device 13 connected to the backbone 5. The connection to backbone 5 is established by means of the media specific interface 6, in which the adjustment to the levels required by the respective transmission medium also occurs. Lines 7 are provided between the interface 6 and the network controller 4, which all represent a media-independent interface between the network controller 4 and the media specific interface 6. A clock module 8 is switched into these lines 7. This clock module 8 equips the data packet with a time stamp in case of time critical information every time when the network controller relays a data packet to the media specific interface 6. The echo that a signal has been received by another CPU 2, such as the CPU 2' of device 13, occurs via the line 5, the media specific interface 6, the network controller 4, and the parallel bus 3 to the CPU 2. A comparison of the time stamp of the sending CPU's 2 clock module 8 with the time stamp of the receiver permits a conclusion as to the accuracy of the time basis in consideration of the known or measured run time of the signals between two known addresses, and subsequently enables the CPU 2 to generate signals with which the clock frequency of the own clock module 8 is adjusted accordingly in order to increase accuracy. Synchronizations can be achieved in this way in which the known maximum deviation of the clocks in the clock generators of processors that are different from each other can be maintained within a nanosecond range. The respective setup or configuration signals are now relayed from the CPU 2 to the clock module 8 via the network controller 4, whereby according to the embodiment shown in FIGS. 1 and 2, the network controller 4 itself is capable of detecting such configuration signals due to their identification as configuration signals. In these cases, the network controller 4 communicates to the media specific interface 6 via the line 9 that this information is not intended for a relay to the network 5, but instead is to be returned to its own CPU 2 together with a respective confirmation by the clock module 8 of the correction performed.

Thus, the synchronization of clock module 8' of device 12 with the clock module 8 of device 13 happens as follows: A data packet compiled by CPU 2 is forwarded to the network controller 4. After the data packet has been released by the network controller 4 it passes the clock module 8, where a time stamp is inserted into the data packet. The data packet via interface 6 and backbone 5 is then sent to device 13, where it first passes the interface 6' and then receives a time stamp by clock module 8' representing the time of receipt of the data packet by device 13. Subsequently, the data packet is forwarded to the network controller 4' and to CPU 2'. After receipt of the data packet, CPU 2' sends the data packet or a receipt confirmation back to CPU 2 of device 12 so that CPU 2 may generate a configuration signal based on a comparison between the time stamp inserted by clock module 8 at the time of sending said data packet and the time stamp inserted by clock module 8' at the time of receiving said data packet, considering known or measured run times of signals between the device 12 and device 13. This configuration signal contains time correction information for the clock module 8. Another configuration signal may be generated containing time correction information for the clock module 8' of the remote device 13 so that clock module 8 and clock module 8' are each corrected in order to achieve synchronization of both clock modules 8, 8'. The network controllers 4, 4' and the clock modules 8, 8' are able to identify their respective configuration signals by means of identifiers contained in the configuration signals. Upon receipt of a configuration signal by CPU 2, network controller 4 communicates to the media specific interface 6 via the line 9 that this configuration signal is not intended for a relay to the network 5. The configuration signal is then forwarded to clock module 8, where the time correction is performed, and then forwarded to interface 6, which returns the configuration data packet to its own CPU 2 together with a respective confirmation by the clock module 8 of the correction performed.

Figure 3:
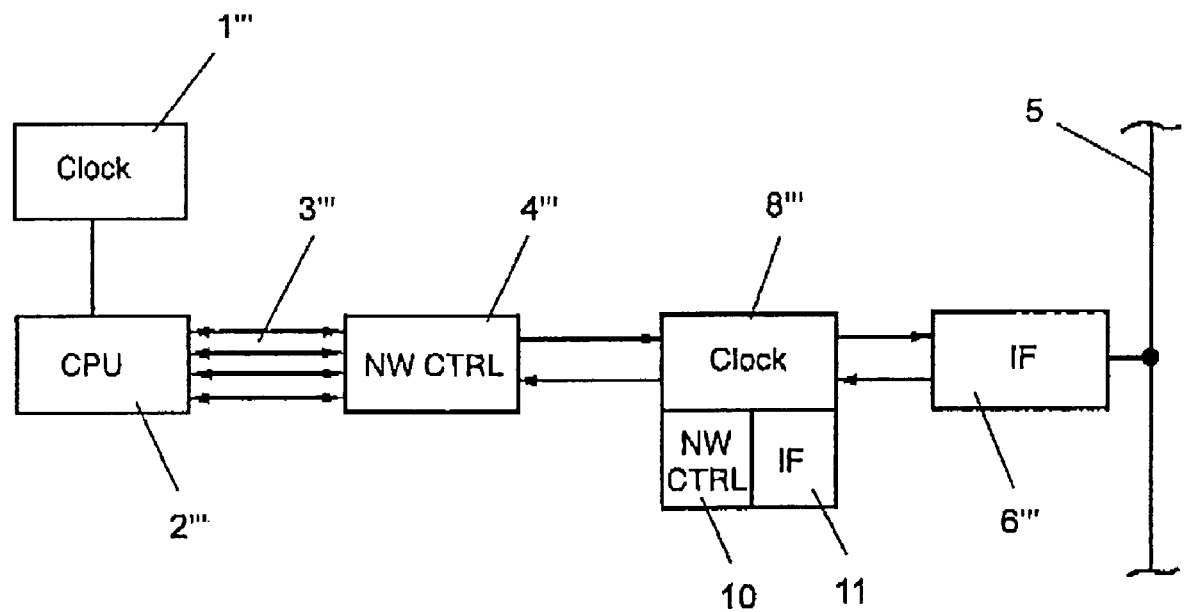

The embodiment according to FIG. 3 shows a device 15, which is an alternative embodiment of device 12 and 13, whereby the additional control line 9 is omitted. In this embodiment, the clock module 8''' by which the time stamp is applied, contains an additional simple variation of a network controller 10''' in the form of a packet detection logic and a clock controller 11''' so that the respective identification of configuration signals can occur within the component group contained in the clock module 8'''.

Figure 2:
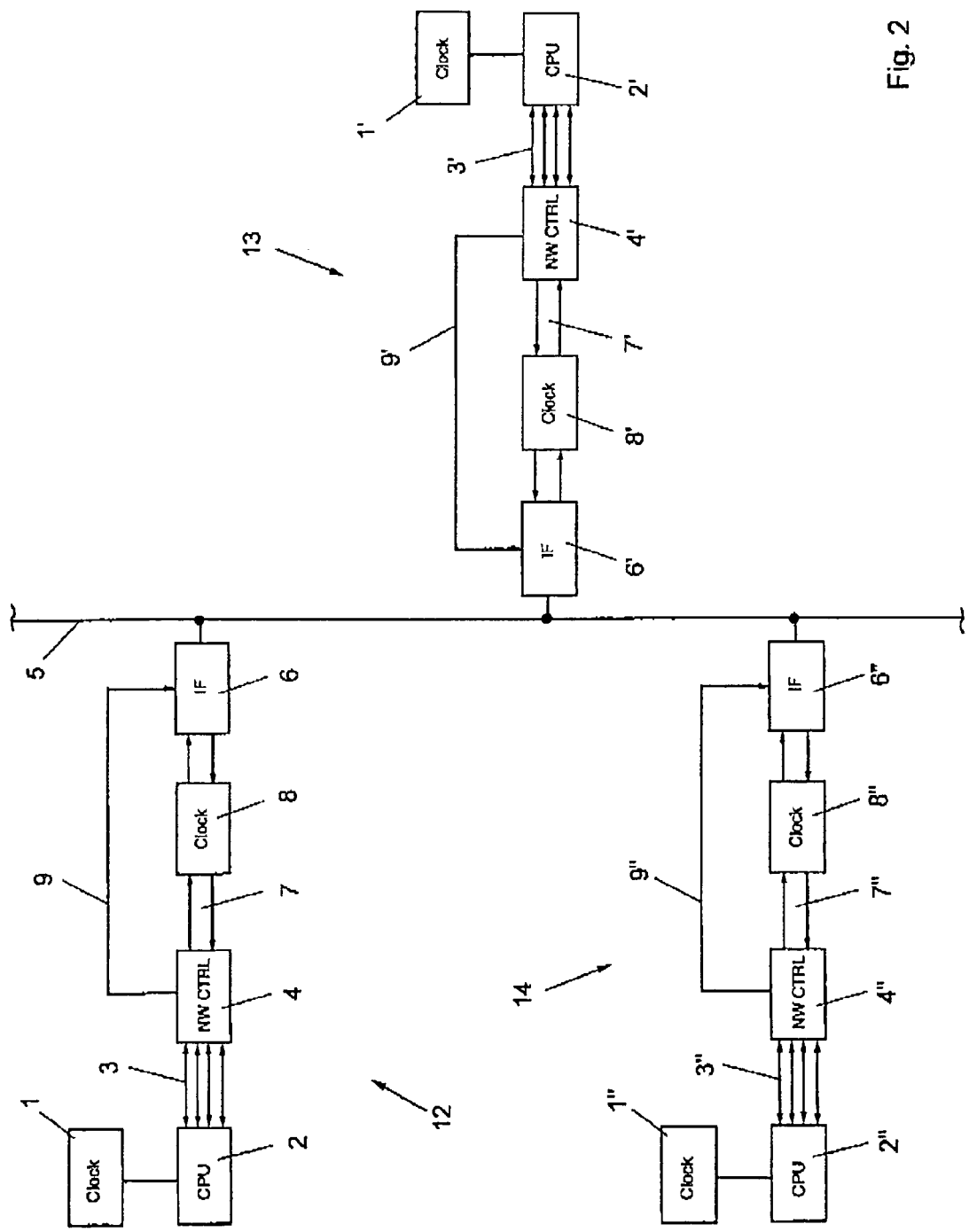

FIG. 2 shows a backbone 5, to which three device 12, 13, 14 are connected, whereby the clock modules 8', 8'', of devices 13, 14 will be synchronized by device 12. To this end, CPU 2 of device 12 sends a data packet to device 13 and another data packet to device 14, whereby a time stamp is inserted into each data packet by clock module 8 at the time of sending. Clock module 8' inserts a time stamp into the data packet sent to device 13 at the time the data packet is received by device 13 and clock module 8'' inserts a time stamp into the data packet sent to device 14 at the time the data packet is received by device 14. Subsequently, the data packets are returned to device 12, whereby CPU 2 generates a configuration signal intended for correction of clock module 8' based on a comparison between the time stamp inserted by clock module 8 at the time of sending said data packet and the time stamp inserted by clock module 8' at the time of receiving said data packet, considering known or measured run times of signals between the device 12 and device 13, and a configuration signal intended for correction of clock module 8'' based on a comparison between the time stamp inserted by clock module 8 at the time of sending said data packet and the time stamp inserted by clock module 8'' at the time of receiving said data packet, considering known or measured run times of signals between the device 12 and device 14, so that the clock modules 8' and 8'' will be synchronized.

The invention claimed is:

1. Method for synchronizing computer clocks in networks used for information transfer, comprising the steps of:
   sending a first data packet from a sender to an addressee;
   inserting a time stamp into said data packet at the moment said data packet is sent by the sender;
   inserting a time stamp into said data packet when said data packet is received by the addressee, wherein said time stamps are inserted by a post-connected clock module into said data packet, after release of transfer of the data packet by a network controller; and
sending said data packet or a receipt confirmation back from said addressee to said sender,
wherein a CPU of the sender generates configuration signals for correction of one or more of a clock module of the sender and a clock module of the addressee, said configuration signals being equipped with an identifier, wherein said generation of configuration signals is based on a comparison between the time stamp inserted at the time of sending said data packet and the time stamp inserted at the time of receiving said data packet, considering known or measured run times of signals between the addressee and the sender,
said configuration signals being sent to and processed by one or more of the clock modules of the sender and of the addressee, thereby achieving synchronization.

2. Method according to claim 1, wherein at least one of configuration signals for the correction of the clock module of the sender or the addressee, control signals, and status signals of the clock modules, is transferred with an identifier that is evaluated by a packet detection logic of one or more of the clock modules of the sender and of the addressee, and wherein said configuration signals transferred with said identifier is used for correction of time of one or more of the clock modules of the sender and of the addressee.

3. Method according to claim 1, wherein the network controller directly communicates with an interface circuit and generates a command for causing at least one of configuration, control and status signals that are sent to the clock module of the sender by the CPU of the sender to return to the CPU of the sender.

4. Method according to claim 2, wherein the network controller directly communicates with an interface circuit and generates a command for causing at least one of configuration, control and status signals that are sent to the clock module of the sender by the CPU of the sender to return to the CPU of the sender.

5. Method according to claim 1, further comprising the step of sending back said first data packet from said addressee to said sender, wherein at least one of configuration, control, and status signals for a computer clock of the addressee are calculated on the CPU of the sender, and are sent out as a configuration, control and status data packet to the network controller of the computer clock of the addressee.

6. Method according to claim 2, further comprising the step of sending back said first data packet from said addressee to said sender, wherein at least one of configuration, control, and status signals for a computer clock of the addressee are calculated on the CPU of the sender, and are sent out as a configuration, control and status data packet to the network controller of the computer clock of the addressee.

7. Method according to claim 3, further comprising the step of sending back said first data packet from said addressee to said sender, wherein at least one of configuration, control, and status signals for a computer clock of the addressee are calculated on the CPU of the sender, and are sent out as a configuration, control and status data packet to the network controller of the computer clock of the addressee.

8. Method according to claim 4, further comprising the step of sending back said first data packet from said addressee to said sender, wherein at least one of configuration, control, and status signals for a computer clock of the addressee are calculated on the CPU of the sender, and are sent out as a configuration, control and status data packet to the network controller of the computer clock of the addressee.

9. Method according to claim 1, wherein synchronization occurs via switches, whereby residence time of said data packet in a switch is measured, and each switch is equipped with a computer clock and each switch is equipped with a time measurement device at all switch ports.

10. Method according to claim 2, wherein synchronization occurs via switches, whereby residence time of said data packet in a switch is measured, and each switch is equipped with a computer clock and each switch is equipped a time measurement device at all switch ports.

11. Method according to claim 3, wherein synchronization occurs via switches, whereby residence time of said data packet in a switch is measured, and each switch is equipped with a computer clock and each switch is equipped with a time measurement device at all switch ports.

12. Method according to claim 4, wherein synchronization occurs via switches, whereby residence time of said data packet in a switch is measured, and each switch is equipped with a computer clock and each switch is equipped with a time measurement device at all switch ports.

13. Method according to claim 5, wherein synchronization occurs via switches, whereby residence time of said first data packet in a switch is measured, and each switch is equipped with a computer clock and each switch is equipped with a time measurement device at all switch ports.

14. Method according to claim 6, wherein synchronization occurs via switches, whereby residence time of said first data packet in a switch is measured, and each switch is equipped with a computer clock and each switch is equipped with a time measurement device at all switch ports.

15. Method according to claim 7, wherein synchronization occurs via switches, whereby residence time of said first data packet in a switch is, and each switch is equipped with a computer clock and each switch is equipped with a time measurement device at all switch ports.

16. Method according to claim 8, wherein synchronization occurs via switches, whereby residence time of said first data packet in a switch is measured, and each switch is equipped with a computer clock and each switch is equipped with a time measurement device at all switch ports.

17. Device for synchronizing computer clocks in networks used for information transfer, wherein data packets are equipped with a time stamp at the moment of their sending, and with a time stamp at the moment of receipt at a target address,
said device comprising at least one network controller for sending and receiving data packets,
said device further comprising at least one clock module being assigned to said at least one network controller, said clock module being post-connected to said network controller such that a data packet being sent is equipped with a time stamp after release of transfer of said data packet by said network controller, and
said device further comprising a CPU for generating configuration signals for correction of the clock module,
wherein said generation of configuration signals is based on a comparison between the time stamp inserted at the time of sending said data packet and the time stamp inserted at the time of receiving said data packet, considering known or measured run times of signals between the network controller of the sender and the target address.

18. Device according to claim 17, wherein each network controller comprises a packet detection logic and a clock controller, whereby at least one of configuration, control, and status signals sent by said CPU are performed, or processed after the clock controller checks the target address in the network controller, and information is entered into a detected packet.

19. Device according to claim 17, wherein a packet detection logic for detection of at least one of configuration, control, and status query signals, and a related computer clock, are integrated into one component group.

20. Method for synchronizing computer clocks in networks used for information transfer, comprising the steps of:

sending a data packet from a sender to an addressee;

inserting a time stamp into said data packet at the moment said data packet is sent by the sender;

inserting a time stamp into said data packet when said data packet is received by the addressee;

sending back said data packet from said addressee to said sender, wherein said time stamps are inserted by a post-connected clock module into said data packet, after release of transfer of the data packet by a network controller, and wherein configuration signals for correction of a computer clock of the addressee are calculated on a CPU of the sender, and are sent out as a configuration data packet to a network controller of a computer clock of the addressee, said configuration signals being equipped with an identifier, wherein said generation of configuration signals is based on a comparison between the time stamp inserted at the time of sending said data packet and the time stamp inserted at the time of receiving said data packet, considering known or measured run times of signals between the addressee and the sender, said configuration signals being sent to and processed by the computer clock of the addressee, thereby achieving synchronization.

21. Method for synchronizing computer clocks in networks used for information transfer, comprising the steps of:

sending a data packet from a sender to an addressee;

inserting a time stamp into said data packet at the moment said data packet is sent by the sender; and inserting a time stamp into said data packet when said data packet is received by the addressee;

wherein said time stamps are inserted by a post-connected clock module into said data packet, after release of transfer of the data packet by a network controller, and wherein synchronization occurs via switches, whereby residence time of said data packet in a switch is measured, and each switch is equipped with a computer clock and each switch is equipped with a time measurement device at all switch ports, and wherein a CPU of the sender generates configuration signals for correction of one or more of clock modules of the sender and of the addressee, said configuration signals being equipped with an identifier, wherein said generation of configuration signals is based on a comparison between the time stamp inserted at the time of sending said data packet and the time stamp inserted at the time of receiving said data packet, considering known or measured run times of signals between the addressee and the sender, said configuration signals being sent to and processed by one or more of the clock modules of the sender and of the addressee, thereby achieving synchronization.

* * * * *